United States Patent [19]

Konars et al.

[11] 4,239,117
[45] Dec. 16, 1980

[54] HIGH SPEED DOCUMENT SORTING MEANS

[75] Inventors: Clement R. Konars, Glen Cove; Emanuel Quinci, Dix Hills; Mario Vascotto, Bayville, all of N.Y.

[73] Assignee: Halm Instrument Co., Inc., Glen Head, N.Y.

[21] Appl. No.: 764,764

[22] Filed: Feb. 1, 1977

[51] Int. Cl.³ .............................................. B07C 5/00
[52] U.S. Cl. ................................... 209/553; 209/583; 209/643; 209/933; 209/925; 271/283; 271/217; 271/305
[58] Field of Search .................... 209/73, 74 R, 74 M, 209/111.7, 111.8, 553, 583, 643, 933, 925; 271/64, 217, 283, 305

[56] References Cited

U.S. PATENT DOCUMENTS

| | | | |
|---|---|---|---|
| 1,188,064 | 6/1916 | Gideon | 271/217 |
| 2,804,974 | 9/1957 | Noon | 209/74 |
| 4,030,607 | 6/1977 | Sudai et al. | 271/64 |

*Primary Examiner*—Allen N. Knowles
*Attorney, Agent, or Firm*—James P. Malone

[57] ABSTRACT

High speed document processing and sorting apparatus. A stream of documents is guided along a path at high speed. A detector is mounted along said path to detect identifiable documents. A magazine is mounted to receive the detected documents. A vacuum wheel is mounted to remove the detected documents from said path to said magazine. The vacuum picker comprises a vacuum wheel mounted a predetermined spacing over said path, the vacuum wheel having a surface speed equal to the high speed document speed. A solid wheel is movably mounted below said vacuum wheel and below said path. A detector control moves the solid wheel and document up into contact with the vacuum wheel when it is desired to remove a document moving at high speed.

2 Claims, 4 Drawing Figures

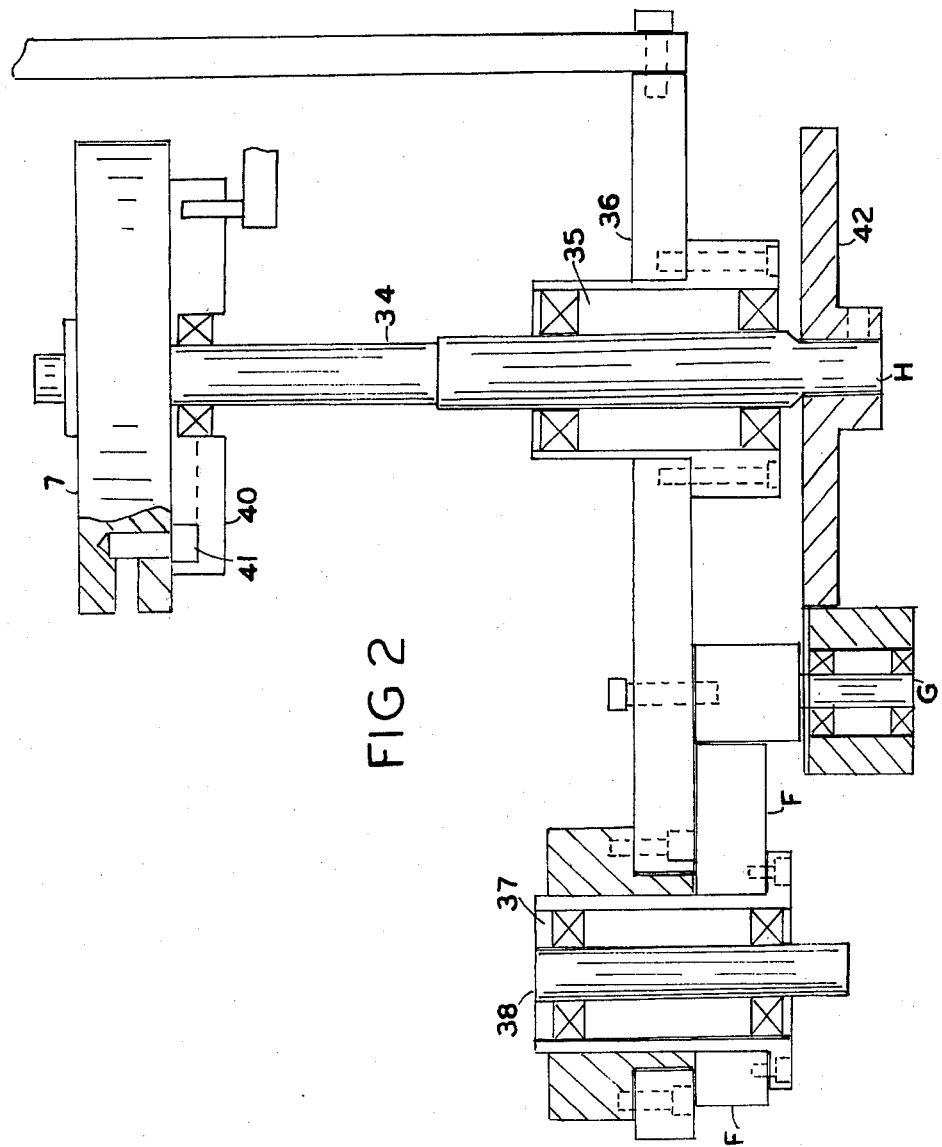

HIGH SPEED DOCUMENT SORTING MEANS

This invention relates to document detector and collector means and more particular to means for detecting identifiable documents and removing them from a fast moving stream of documents.

The printing of currency bills, bonds and stock certificates and similar documents is generally done by printing sheets of the documents. The sheets are then visually inspected for defects in the printing. The inspector identifies the rejects by placing a sticker, for instance of aluminum, on the rejects. The sheets are then cut up and the documents are fed to a numbering press. Before the numbers are printed, it is necessary to remove the rejected documents from the stream of documents.

The present invention solves this problem, in the illustrated embodiment, the rejected documents are tagged, for instance, with an aluminum sticker. After the sheets have been cut up into the individual documents they are fed on a conveying means past the detector to detect the rejects. When the detector detects a reject it actuates a rotary vacuum sucker which removes the reject from the high speed stream of documents and feeds the rejects to a magazine. The rejects are counted enroute to the magazine.

It has been found that valving the vacuum for each document to be picked up greatly limits the speed of this type device, due to the time required to operate a solenoid and vacuum valve.

In the present invention, the speed is greatly increased by always having the vacuum on as the vacuum port passes over the documents. The vacuum wheel is mounted out of vacuum contact with the documents and the selected documents are pushed up into vacuum contact with the vacuum wheel by a small solid wheel pivotally mounted underneath the vacuum wheel.

Therefore each time a document is selected to be removed the small solid wheel lifts up the document into vacuum contact with the vacuum wheel to provide high speed operation.

Accordingly, a principal object of the invention is to provide new and improved document detecting and collecting means.

Another object of the invention is to provide new and improved document detecting and collecting means to collect identifiable documents from a high speed stream of documents.

Another object of the invention is to provide new and improved document detecting and collecting means where the identifiable documents are tagged with a metal sticker.

Another object of the invention is to provide new and improved document detecting and collecting means where rejected documents are tagged with a metal sticker comprising a metal detector connected to actuate a rotary vacuum sucker which removes the reject from the high speed stream of documents.

Another object of the invention is to provide new and improved document processing means comprising, means for guiding a plurality of documents along a path at high speed, means mounted along said path to detect identifiable documents, a magazine mounted to receive the detected documents, and vacuum means mounted to remove the detected documents from said path to said magazine.

Another object of the invention is to provide new and improved document processing means comprising, means for guiding a plurality of documents along a path at high speed, means mounted along said path to detect identifiable documents, a magazine mounted to receive the detected documents, and vacuum means mounted to remove the detected documents from said path to said magazine, wherein the vacuum means comprises a vacuum wheel mounted a predetermined spacing over said path, said vacuum wheel having a surface speed equal to the high speed document speed, a solid wheel movably mounted below said vacuum wheel and below said path, and means responsive to the detecting means to move said solid wheel up into contact with said vacuum wheel when it is desired to remove a document moving at high speed path.

These and other objects of the invention will be apparent from the following specification and drawings, of which:

FIG. 2 is a plan view of an embodiment of the invention.

Figure 1:
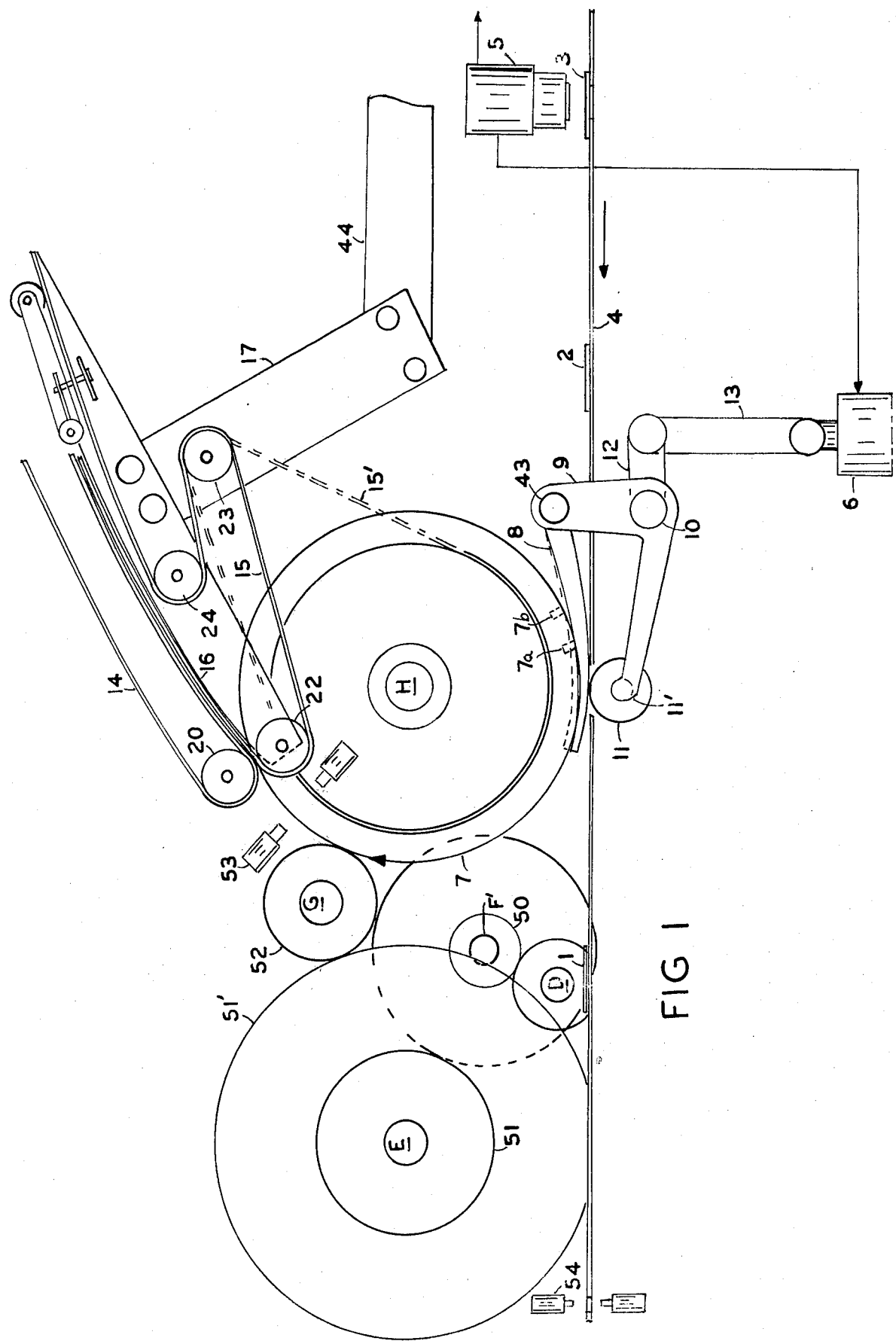
FIGS. 1 and 1A are side views of an embodiment of the invention.

Referring to the Figures, documents 1, 2, 3, etc., are fed along the path 4 at high speed by conventional means, such as a push chain conveyor. The documents are timed in registration with the vacuum wheel 7.

The identifiable documents which have been previously marked with a dye or a metal tag are detected by the photo detector 5. The photo detector operates a solenoid 6 which operates the vacuum sorting means.

The vacuum sorting means comprises the vacuum wheel 7, which is driven at the same surface speed as the documents. The vacuum wheel does not run in contact with the documents but is mounted out of vacuum contact, for instance, about one-eighth of an inch above the documents. In order to insure that no documents are inadvertently picked up, a pair of upper guides 8 ride on top of the documents as they pass under the vacuum wheel. The guides are mounted on the linkage 9 which is pivotally mounted on the frame on the shaft 10. The other arm of the member 9 mounts a small wheel 11 which normally sits just under the document path. The crank arm 9 is connected to the solenoid 6 by means of the linkage members 12 and 13.

Therefore, when a document is identified by the detector 5, the solenoid 6 is operated to rotate crank arm 9 clockwise thereby raising the guides 8 and the wheel 11. The wheel 11 is raised into contact with the vacuum wheel 7 so that the identified document is popped up into contact with the vacuum ports 7a, 7b, of the vacuum wheel 7. The selected document is then carried by the vacuum wheel in the direction of the arrow. A delay is designed into the system to compensate for the document travel time between the detector 5 and the vacuum wheel 7.

The document is then passed from the vacuum wheel 7 between an upper belt 14 and a lower belt 15, which ride on a curved plate 16. The curved plate 16 is mounted by means of the bracket 17 which is mounted on the frame. At least one of the belts is driven. Rejected documents are counted by photocell counter 53 and good documents are counted by photocell counter 54.

Figure 1A:
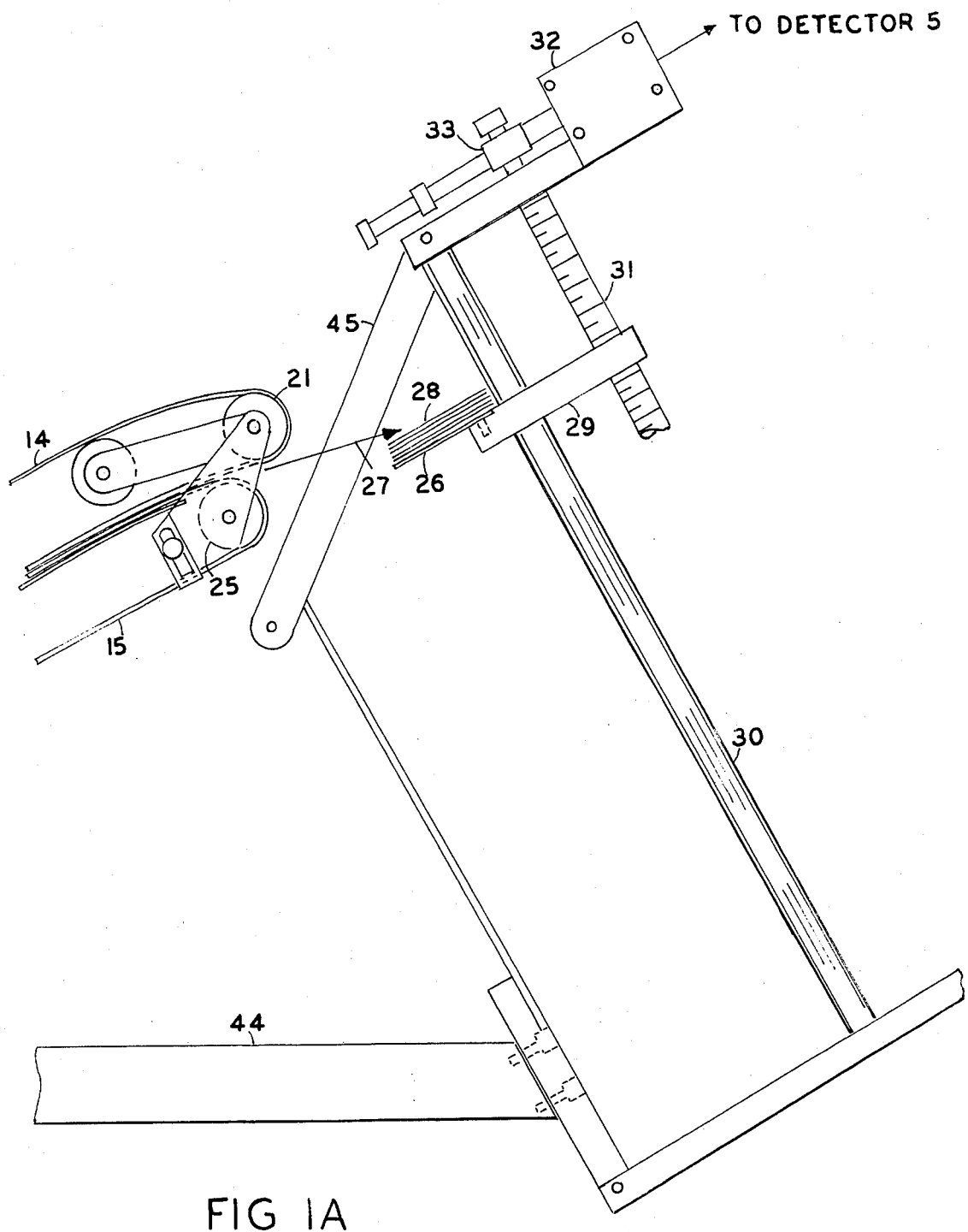

Referring also to FIG. 1A, the upper belt 14 rides on sprockets 20 and 21 and the lower belt 15 rides on sprockets 22, 23, 24 and 25. The documents are then deposited on the magazine tray 26 as shown by the arrow 27. In order for proper feeding of the magazine tray 26, the top of the stack 28 must be maintained in the position shown to receive the documents ejected from between the belts 14 and 15. For this purpose the tray 26 is mounted on a carriage 29 which rides on two guide rods 30, and a corresponding rod on the other side and is threadedly engaged on the threaded screw 31. The magazine tray assembly is mounted by brackets 44, 45 which are connected to the frame of the machine.

The threaded screw 31 is operated to drive the carriage 29, by means of the solenoid 32 which is operated by the document detector 5. Each time a document is detected the solenoid 32 operates the one way clutch 33 to turn the screw 31 a fraction of a turn. This lowers the carriage 29 in tray 26 to maintain the position of the top of the stack 28 at the proper position for receiving documents ejected from the belts 14 and 15.

The lower belt 15 is driven by the chain 15' which is driven by a gear on the vacuum wheel shaft H. The upper belt 14 is driven by the lower belt.

As previously mentioned, the vacuum wheel assembly may be rotated about its mounting pivot. The vacuum wheel assembly is driven from the driven gear D which is an existing gear on the machine upon which the vacuum wheel assembly is mounted. When the vacuum wheel assembly is in lowered position the existing driven gear D meshes with the gear 50 on shaft F', which in turn meshes with the gear 51 on shaft E. The gear 51 on shaft E meshes with gear 52 on shaft G, which in turn meshes with the gear 42 on shaft H, the vacuum wheel shaft, in order to drive the vacuum wheel.

FIG. 2 shows a top view of the vacuum wheel 7 assembly which is mounted on the shaft 34, which is mounted in the bearing block 35. The bearing block 35 is mounted in the mounting member 36. The member 36 is pivotally mounted on the frame F of the machine by means of the bearing block 37. By means of this mounting, the vacuum wheel assembly including members 34, 35 and 36, may be rotated about the shaft 38, in order to raise the vacuum wheel assembly for the purpose of servicing the machine.

Vacuum is applied to the vacuum wheel 7 by means of the valve plate 40 which carries vacuum in the groove 41, which is cut so that vacuum is always applied at least from the points indicated by the ports 7a and 7b in FIG. 1 until the ports 7a and 7b pass the bite of the belts 14 and 15.

Figure 3:
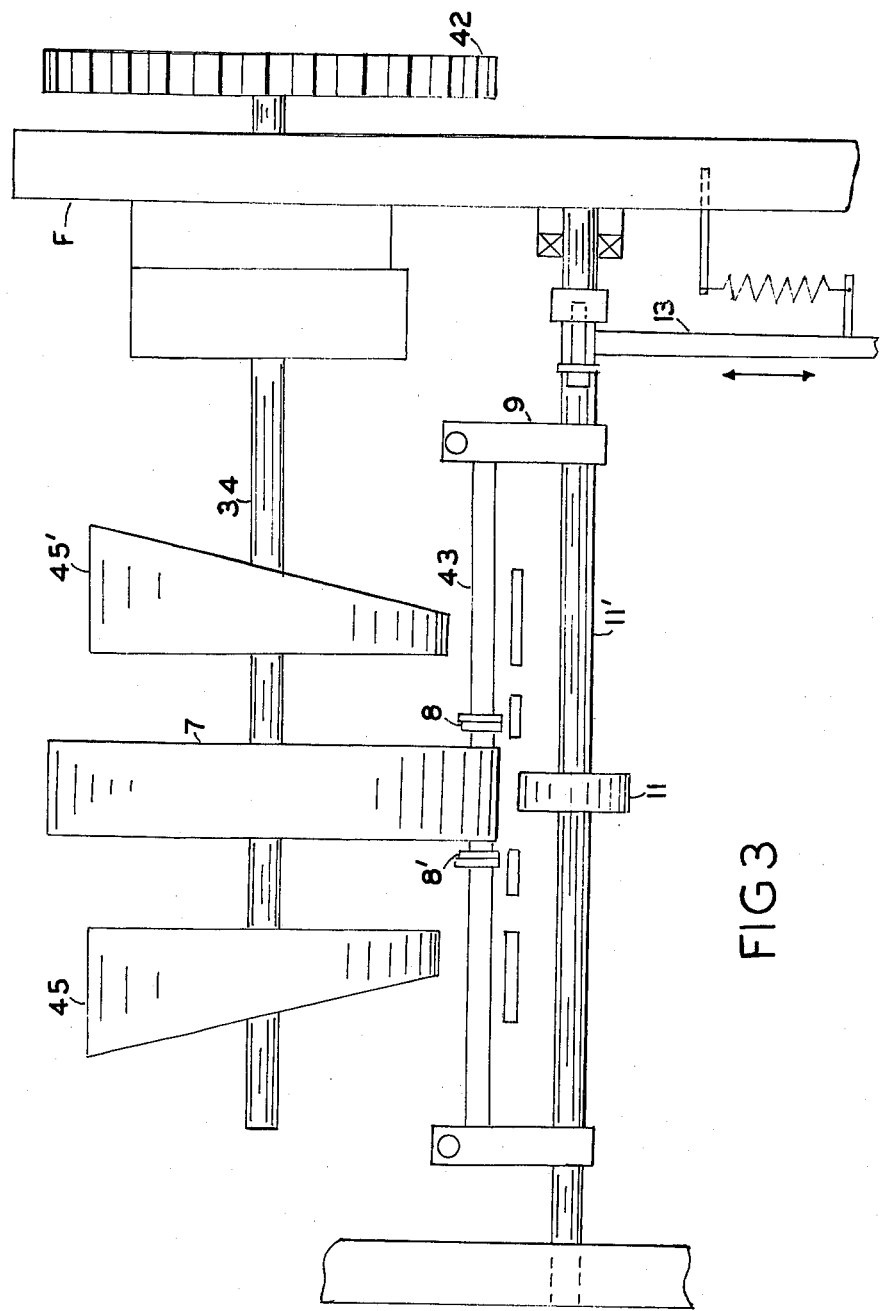
FIG. 3 is an elevation view partly in section of the embodiment of the invention.

FIG. 3 shows an elevation view partly in section of the embodiment of FIG. 1. Vacuum wheel 7 is mounted on shaft 34 which is mounted on the frame F and driven by the driven gear 42. The guide arms 8 and 8' are mounted on a shaft 43 which is mounted on the crank arm 9. The solid wheel 11 is mounted on the shaft 11' which is also mounted on crank arm 9. The crank arm 9 is operated by the linkage member 13 which is operated by the solenoid 6 as shown in FIG. 1. Curved guides 45 and 45' having the same curvature as the vacuum wheel are mounted so that the documents ride between the vacuum wheel and the guides 45 and 45'.

It is claimed:

1. Document processing means comprising, means for guiding a plurality of documents along a path at high speed, means mounted along said path to detect identifiable documents, a magazine mounted to receive the detected documents, and vacuum means mounted to remove the detected documents from said path to said magazine, the vacuum means comprising a vacuum wheel mounted a predetermined spacing over said path, said vacuum wheel having a surface speed equal to the high speed document speed, a solid wheel movably mounted below said vacuum wheel and below said path, and means responsive to the detecting means to move said solid wheel up into contact with said vacuum wheel when it is desired to remove a document moving at high speed path, a curved top guide pivotally mounted under said vacuum wheel, said top guide normally separating documents from said vacuum wheel, and means to lift said top guide in synchronism with said solid wheel so that the vacuum wheel can remove documents from said path.

2. Apparatus as in claim 1, wherein said vacuum removing means comprises, a double belt conveyor mounted above the vacuum wheel, a magazine mounted at the end of said conveyor, said magazine comprising a movably mounted tray mounted at the end of said conveyor to receive said documents, means to maintain the top of the stack of said tray at a predetermined height with respect to the end of the conveyor comprising a driven screw threadably engaged to said tray, and means to rotate said screw a predetermined amount everytime a document is fed to said tray.

* * * * *